W. P. LOUDON.
STORAGE BATTERY CONSTRUCTION.
APPLICATION FILED FEB. 13, 1918.
1,395,992.
Patented Nov. 1, 1921.
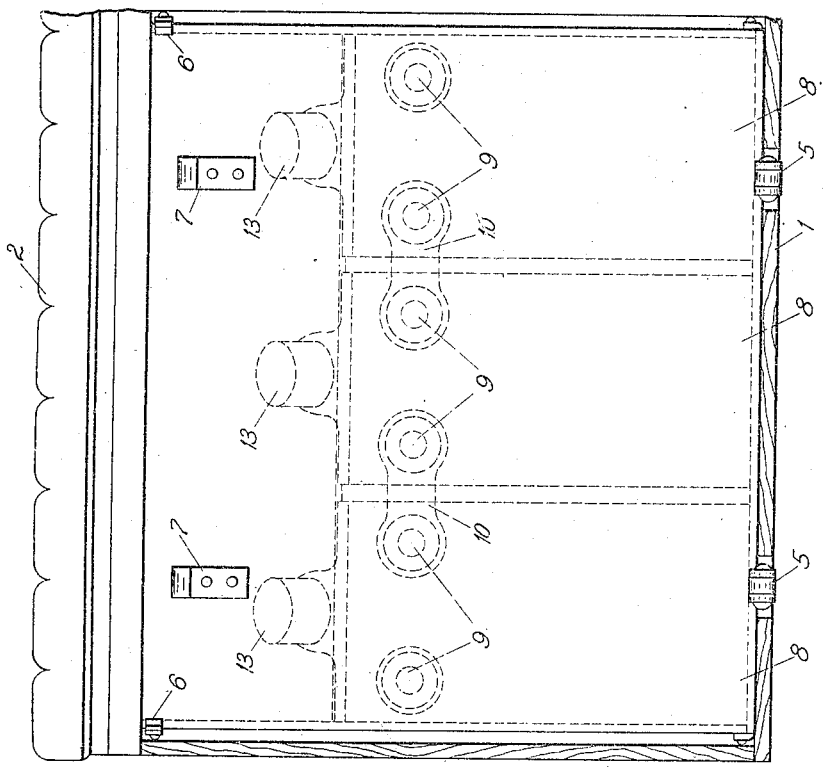
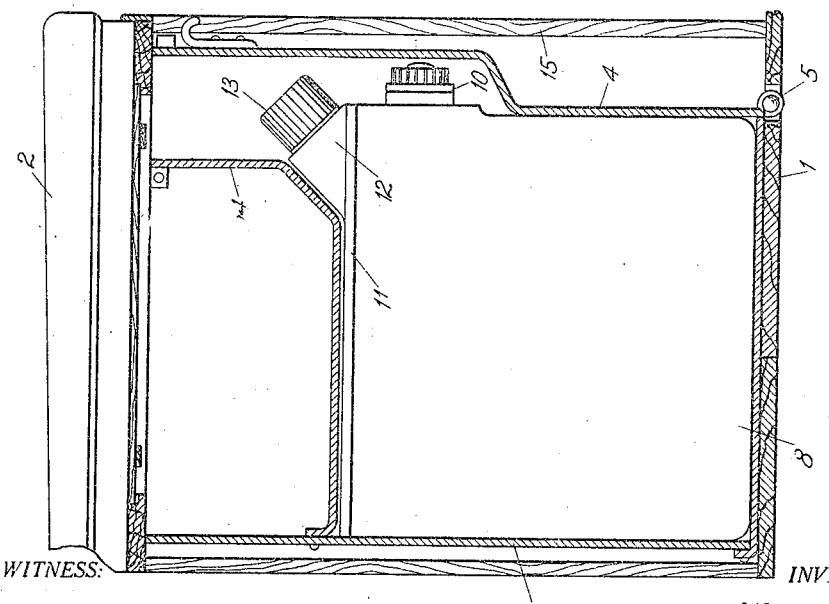
WITNESS:
Dominic P. Cone
INVENTOR.
Warren P. Loudon
BY
ATTORNEY.

UNITED STATES PATENT OFFICE.

WARREN P. LOUDON, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY CONSTRUCTION.

1,395,992.  Specification of Letters Patent.  Patented Nov. 1, 1921.

Application filed February 13, 1918. Serial No. 216,989.

*To all whom it may concern:*

Be it known that I, WARREN P. LOUDON, a citizen of the United States, residing at Niagara Falls, in the county of Niagara and State of New York, have invented new and useful Improvements in Storage-Battery Constructions, of which the following is a specification.

The present invention relates to storage battery construction.

In automobiles, it is customary to provide space beneath the seat, which space is available for storage. Such space is very suitable for the location of the storage battery which is provided on modern cars for ignition, starting and lighting purposes. The present invention relates to construction whereby the storage battery may be conveniently located in said space.

An object of the present invention is to provide a construction of storage battery which is peculiarly adaptable for insertion in the space referred to.

A further object is to provide an improved construction whereby the storage battery may be mounted under the seat.

Further objects will be apparent as the description proceeds.

Referring to the drawings:—

Figures 1 and 2 represent in sectional end elevation and front elevation respectively, one embodiment of the present invention.

The numeral 1 indicates the floor of an automobile. Suitably mounted above said floor is a seat 2. Said seat 2 is ordinarily so constructed as to provide space between said seat and the floor. Mounted in said space is a box which is indicated as a whole by the numeral 3. Said box may be of sheet metal or any other suitable material and may be provided with a front closing portion 4 hinged at points 5, 5. The closure portion 4 may be held in closed position by means of snap fasteners 6, 6. Finger holds 7, 7, may be provided for manipulating the closure member 4. The box 3 will be of suitable dimensions to hold a battery of storage cells. Three of said cells are illustrated in Fig. 2.

The type of storage battery cell which is particularly adaptable for insertion under the seat 2 within the box 3, has its electrical conductors extending from one side of said cell and has its filling and inspection vent arranged adjacent to said side whereby to be readily accessible from the front of the seat. The storage battery cell is indicated as a whole by the numeral 8. The electric conductors extending therefrom are indicated by the numerals 9, 9, said conductors being suitably connected by means of links 10, 10. Each of the cells 8, 8, is provided with a cover 11, which is provided with a shoulder 12 adjacent to the front side of the cell. Said shoulder provides a filling and inspection aperture whose axis is arranged at an angle to the front wall of the storage battery cell. The aperture referred to is closed by the cap 13. It will be clear that when the storage battery cells require attention, it will be necessary only to open the box 3 by moving the closure member 4. At this time, any of the filling and inspection caps 13 may be removed for the purpose of filling the cells, or the links 10 may be manipulated without removing the cells from beneath the seat. Should it be necessary, however, to remove the cells from beneath the seat, or to remove any one of the cells, such removal may be readily accomplished from the front, inasmuch as all the electrical connections are accessible from the front. A wall portion 14 may be provided within the box 3, conforming in general to the outline of the top of the cells, which wall portion will provide a chamber accessible from the top. A front board 15 may be provided under the seat, if desired, but said front board should not extend the full width of the seat. Said front board 15 should not extend in front of the closing member 4 of the box 3.

The internal construction of storage battery whereby the electrical leads therefrom may extend from one side of the cell, is not described nor claimed herein, but forms the subject-matter of application, Serial No. 216,988, by the present applicant, filed of even date herewith.

One embodiment of the present invention has been described in detail. Many modifications will occur to those skilled in the art. It is intended in this patent to cover all such modifications that fall within the scope of the present invention as defined by the appended claims.

What I claim as new and desire to secure by Letters Patent of the United States, is—

1. A storage battery cell having terminal posts extending from one of the side walls thereof, said cell having a filling and inspection aperture adjacent to said side wall.

2. A storage battery cell having terminal posts extending from one of the side walls thereof, said cell having a filling and inspection aperture adjacent to said side wall, having its axis at an angle to said side wall.

3. A storage battery cell having a filling aperture in its top portion, said aperture being located close to one of the side walls of said cell whereby to be readily accessible from said side.

4. A storage battery cell having a filling aperture in its top portion, said aperture being located close to one of the side walls of said cell and having its axis at an angle to said side wall.

5. A storage battery cell having a filling aperture in its top portion, said aperture being located close to one of the side walls of said cell, having its axis at an angle to said side wall and being readily accessible from said side wall, said cell having terminal posts extending from said side wall, whereby said posts are also readily accessible from said side wall.

6. In combination, a box having a front closure and adapted to be placed under the seat of an automobile, a storage battery cell in said box, said cell having a filling aperture in it stop portion, said aperture being located close to the front side wall of said cell, having its axis at an angle to said front side wall and being readily accessible from said front side wall, said cell having terminal posts extending from said front side wall, whereby said posts as well as said aperture are readily accessible from the front upon the opening of said closure.

7. In combination, the seat of an automobile providing a space therebeneath, a box in said space adapted to be opened from the front, and a battery cell in said box having its connecting links and its filling and inspection vent readily accessible from the front.

In witness whereof, I have hereunto subscribed my name.

WARREN P. LOUDON.